(12) United States Patent
Borgarelli et al.

(10) Patent No.: US 12,129,015 B2
(45) Date of Patent: Oct. 29, 2024

(54) ROTARY MECHANICAL SCREW TRANSMISSION

(71) Applicant: UMBRAGROUP S.P.A., Foligno (IT)

(72) Inventors: Nicola Borgarelli, Perugia (IT); Luciano Pizzoni, Foligno (IT)

(73) Assignee: UMBRAGROUP S.P.A., Foligno (IT)

( * ) Notice: Subject to any disclaimer, the term of this patent is extended or adjusted under 35 U.S.C. 154(b) by 118 days.

(21) Appl. No.: 17/765,561

(22) PCT Filed: Aug. 27, 2020

(86) PCT No.: PCT/IB2020/058012
§ 371 (c)(1),
(2) Date: Mar. 31, 2022

(87) PCT Pub. No.: WO2021/069981
PCT Pub. Date: Apr. 15, 2021

(65) Prior Publication Data
US 2022/0396349 A1 Dec. 15, 2022

(30) Foreign Application Priority Data

Oct. 9, 2019 (IT) .......................... 102019000018305

(51) Int. Cl.
*F16H 25/22* (2006.01)
*B64C 13/34* (2006.01)
*F16H 25/20* (2006.01)

(52) U.S. Cl.
CPC ......... *B64C 13/34* (2013.01); *F16H 25/2204* (2013.01); *F16H 2025/204* (2013.01); *F16H 2025/2075* (2013.01)

(58) Field of Classification Search
CPC ........... F16H 25/2204; F16H 2025/204; F16H 2025/2075; B64C 13/34
See application file for complete search history.

(56) References Cited

U.S. PATENT DOCUMENTS

| 3,731,546 A | 5/1973 | MacDonald |
| 6,202,498 B1 * | 3/2001 | Schlenker ........... F16H 25/2228 |
| | | 74/424.85 |

(Continued)

FOREIGN PATENT DOCUMENTS

| EP | 2440453 A1 | 4/2012 |
| EP | 3023671 A1 | 5/2016 |
| WO | 20100142771 A1 | 12/2010 |

*Primary Examiner* — Charles A Fox
*Assistant Examiner* — Gregory T Prather
(74) *Attorney, Agent, or Firm* — SHUTTLEWORTH & INGERSOLL, PLC; Timothy J. Klima

(57) ABSTRACT

A rotary mechanical transmission, includes: a containment structure, a first rotary element, connected to a drive unit to define a mechanical power input unit and rotatable about an axis. The transmission also includes a fixed guide and a second rotary element, rotatable about said axis and defining a power output unit. A connecting element extends along the axis and couples to the first rotary element by a first threaded connection. The connecting element is also coupled with one of either the fixed guide and the second rotary element by a second threaded connection, and with the other of the fixed guide and the second rotary element by a linear guide parallel to the axis. The first threaded connection and second threaded connection have different pitches in such a way as to vary the angular speed between the connecting element and the first rotary element.

16 Claims, 8 Drawing Sheets

(56) References Cited

U.S. PATENT DOCUMENTS

2005/0150873 A1* 7/2005 Schmitt-Walter .... B23K 11/253
219/86.32
2017/0248210 A1* 8/2017 Müller ................. E05F 15/622

* cited by examiner

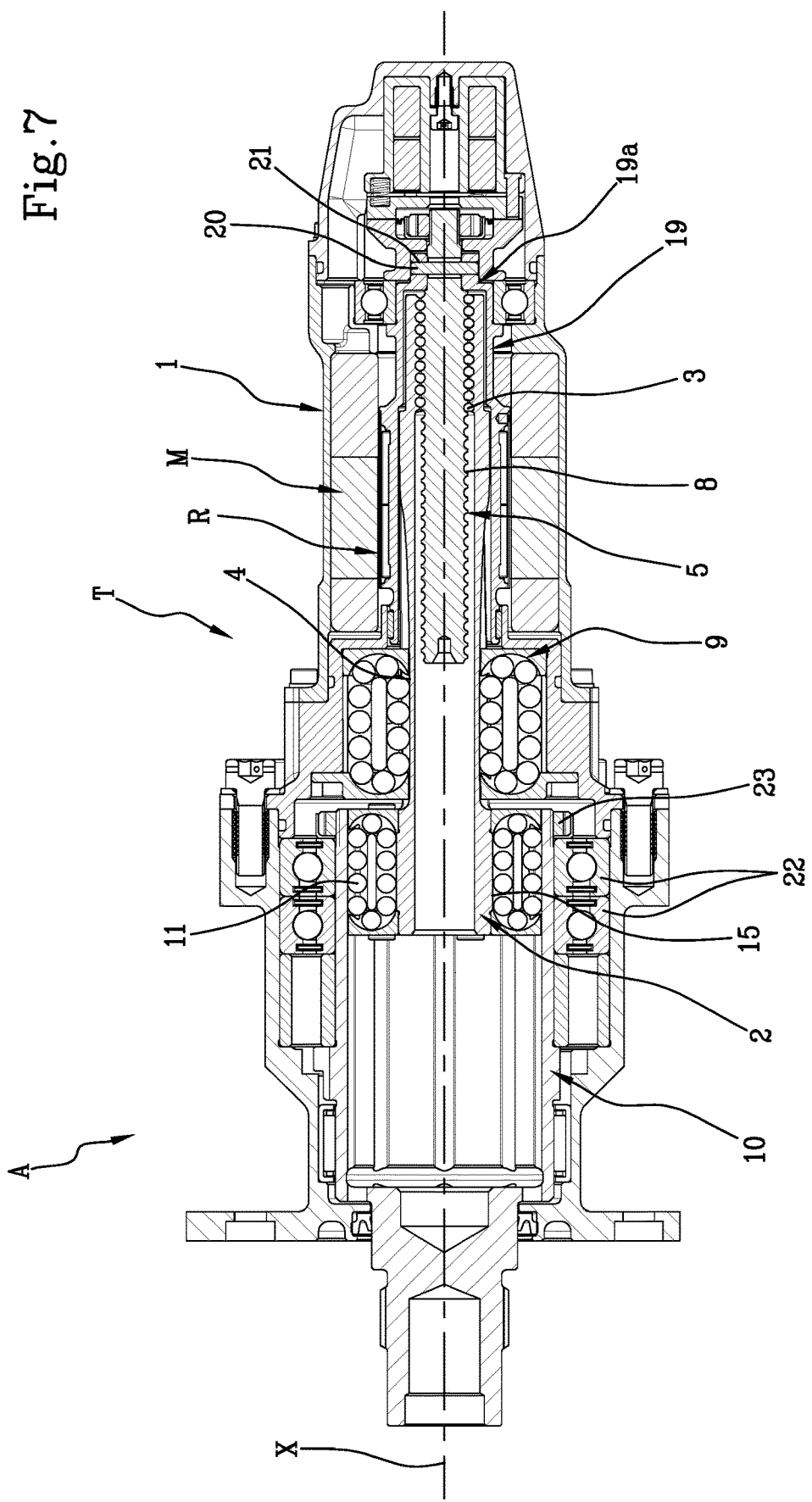

ROTARY MECHANICAL SCREW TRANSMISSION

This application is the National Phase of International Application PCT/IB2020/058012 filed Aug. 27, 2020 which designated the U.S.

This application claims priority to Italian Patent Application No. 102019000018305 filed Oct. 9, 2019, which application is incorporated by reference herein.

This invention relates to a rotary mechanical transmission and is used in particular in the aeronautical field in particular in the control of the surfaces of an aircraft such as, for example, doors or flap.

Rotary electro-mechanical actuators are known in the prior art comprising an electric motor and a transmission consisting, for example, of a screw and a lead nut or a series of gear wheels designed to vary the angular speed of a transmission output element.

Normally, many gears are necessary in order to obtain high reduction gears, often comprising gear wheel chains or, more generally, epicyclic gear mechanisms.

Disadvantageously, these transmission systems have some drawbacks in terms of reliability, efficiency and duration.

In general, the rotary transmission systems based on rotational mechanisms are characterised by a number of components which increases the greater the need is to increase the reduction ratio of the motion. This results in a considerable weight and dimensions of the entire transmission system which is therefore unsuitable for use in applications such as aeronautical ones.

A further drawback derives from the fact that the more components there are in the transmission system the greater will be the costs.

A further drawback is due to the fact that the greater the number components of the transmission system, the greater will be its complexity and consequently the lower will be its reliability and its efficiency.

A further drawback is due to the fact that the higher the reduction ratio which is to be obtained then the lower the overall efficiency of the system will be, especially at low temperatures.

A further drawback derives from the fact that the greater the number of components present in the transmission system then the less rigid the entire kinematic chain will be. Moreover, the use of gear trains also increases the extent of the "backlash", that is to say, the overall clearance between input and output.

A further drawback derives from the fact that, in order to guarantee a greater reduction ratio, some systems use sliding elements. This results in the presence of sliding friction and therefore a marked wear of the contact surfaces which causes a drastic reduction in the service life of the system.

The technical purpose of the invention is therefore to provide a mechanical transmission which is able to overcome the drawbacks of the prior art.

The aim of the invention is therefore to provide a mechanical transmission which allows the number of components present in the transmission system to be reduced whilst guaranteeing the possibility of implementing high or multiplication reduction ratios.

A further aim of the invention is to provide a mechanical transmission which is compact, light and efficient.

The technical purpose indicated and the aims specified are substantially achieved by a mechanical transmission comprising the technical features described in one or more of the accompanying claims. The dependent claims correspond to possible embodiments of the invention.

In particular, the technical purpose and the aims specified are achieved by a mechanical transmission comprising a containment structure, a first rotary element connected or connectable to a drive unit to define a mechanical power input unit and rotatable about an axis. The transmission also comprises a fixed guide, in particular forming part of said containment structure, and a second rotary element rotatable about the axis and defining a power output unit.

The transmission also comprises a connecting element extending along the axis of rotation and coupled to the first rotary element by a first threaded connection, in particular a lead nut and screw or recirculating ball or roller connection.

The connecting element is also coupled with one between the fixed guide and the second rotary element by a second threaded connection, in particular a lead nut and screw or recirculating ball or roller connection, and with the other between the fixed guide and the second rotary element by a linear guide parallel to the axis. The first and second threaded connection have different pitches in such a way as to vary the angular speed between the connecting element and the first rotary element.

In other words, thanks to the different pitches between the first and the second threaded connection, it is possible to actuate a variation in the angular speed between the first rotary element and the second rotary element thereby actuating a reduction or a multiplication of the angular speed of the first rotary element.

Advantageously, this transmission is not bulky and is light and versatile.

In a further embodiment, the connecting element is made in the form of a roto-translational element extending along an axis of rotation and configured for translating along the axis and simultaneously rotating about the axis. In particular, the second threaded connection is positioned between the connecting element and the fixed guide.

The linear guide, on the other hand, is positioned between the connecting element and the second rotary element in such a way that the second rotary element is rotatably connected to the connecting element, to rotate at the same angular speed as the connecting element. Preferably, the linear guide is in this case defined by a splined or recirculating ball connection. In other words, the connecting element is therefore simultaneously coupled to the first rotary element and to the fixed guide respectively by means of the first and the second threaded connection which, having different pitches, cause a variation in the angular speed between the roto-translational element and the first rotary element.

In a possible embodiment of use of the above-mentioned embodiment, the roto-translational motion of the connecting element may constitute a power output of the transmission. In effect, if it were necessary to actuate a roto-translational component, such as, for example, in the case (non-limiting) of drilling means, the connecting element would act directly as an element for output of the power without the need for the presence of the second rotary element.

In a further embodiment of the transmission, the linear guide is positioned between the fixed guide and the connecting element in such a way that the connecting element is equipped with only translational movement along the axis. In this case, the translation of the connecting element along the axis is determined by the rotation of the first rotary element about the axis.

In this embodiment, the second threaded connection is positioned, on the other hand, between the connecting element and the second rotary element. In this way, the rotation of the second rotary element about the axis is determined by the translation of the connecting element along the axis. The mechanical transmission made in this embodiment also comprises an axial locking mechanism acting between the containment structure and the second rotary element for locking the sliding of the second rotary element along the axis.

Further features and advantages of the invention are more apparent in the non-limiting description which follows of a non-exclusive embodiment of a mechanical transmission.

The description is set out below with reference to the accompanying drawings which are provided solely for purposes of illustration without restricting the scope of the invention and in which:

FIG. 7 is a cross section of a further embodiment of the mechanical transmission containing the detail shown in FIG. 6.

The accompanying drawings illustrate different embodiments of the invention.

Figure 1:
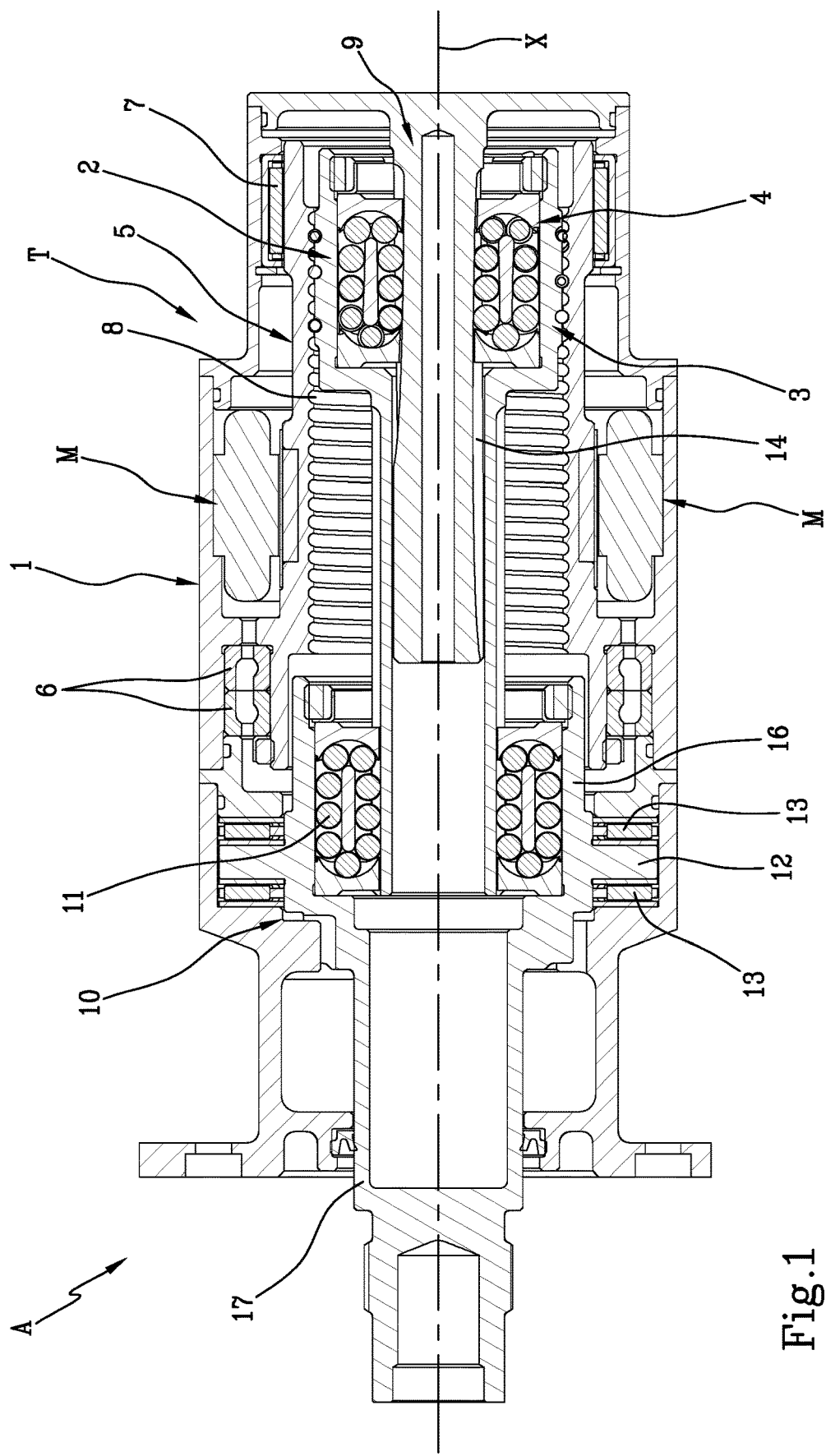
FIG. 1 is a cross section of a mechanical transmission according to the invention.

FIG. 1 illustrates a rotary actuator "A", that is to say, an actuator which transforms a rotary motion having a certain angular speed into a rotary motion having a lower angular speed.

The rotary actuator "A" basically comprises an electric motor "M" and a rotary mechanical drive "T" for achieving a very high reduction ratio.

More in detail, in the embodiment of FIG. 1, the mechanical transmission "T" comprises a containment structure 1, preferably substantially cylindrical in shape, and a connecting element 2 extending along an axis of rotation "X". The connecting element 2 is made in the form of a roto-translational element in such a way as to translate along the axis "X" and simultaneously rotate about the axis "X".

The connecting element 2 comprises a first threaded portion 3 and a second threaded portion 4.

Figure 2A:
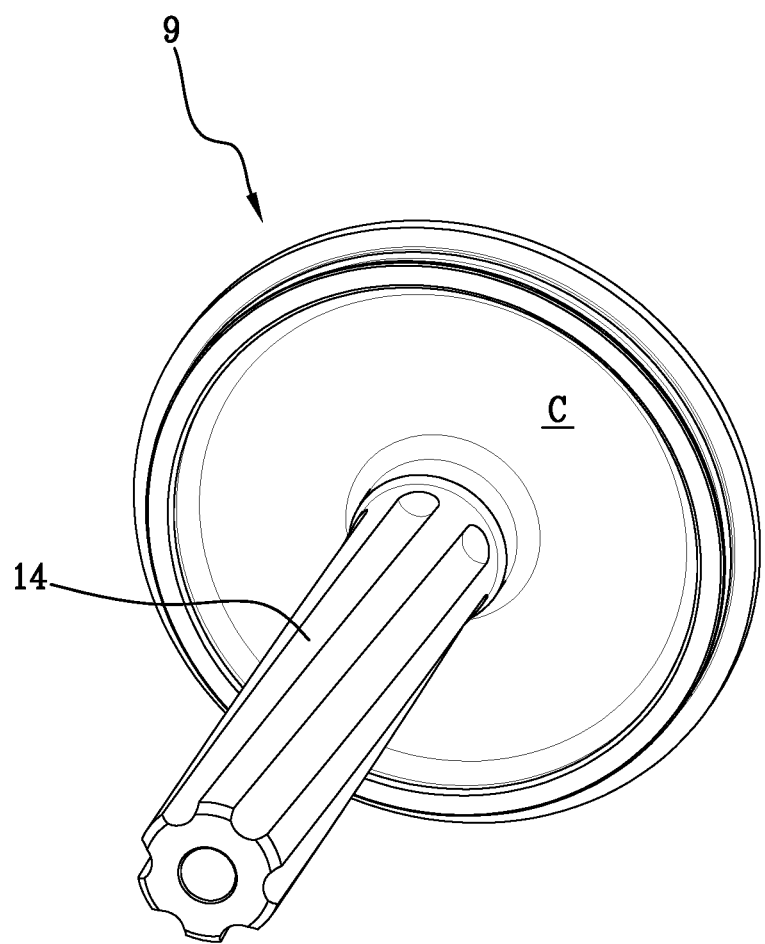
FIGS. 2A and 2B are perspective views of two elements of the mechanical transmission of FIG. 1.
Figure 2B:
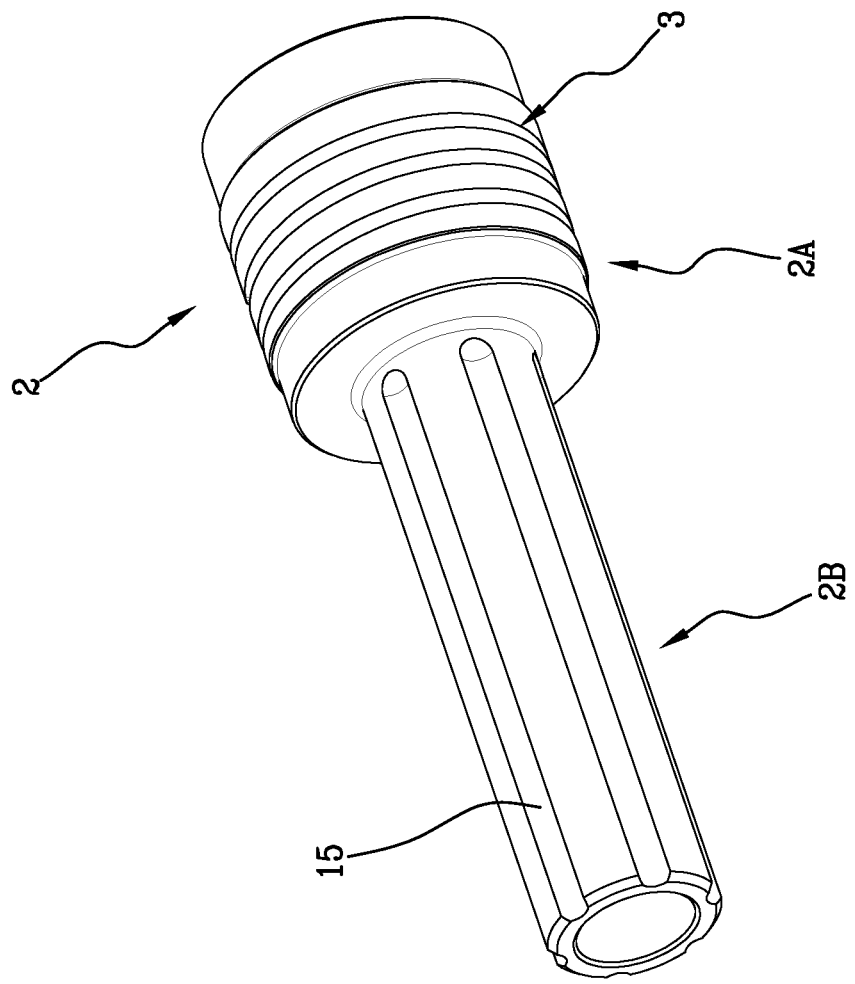

As illustrated in particular in FIG. 2B, the connecting element 2 is made in the form of a hollow body.

In the embodiment shown in FIG. 2B, the connecting element 2 has a first portion with larger diameter 2A, comprising the threaded portions 3, 4, and a second portion with reduced diameter 2B axially spaced from the first portion with larger diameter 2A and having a series of longitudinal grooves defining a linear guide 15.

The mechanical transmission "T" also comprises a first rotary element 5 connected or connectable to a drive unit "M" to define a mechanical power input unit.

In the embodiment of FIG. 1, the first rotary element 5 is made in a hollow form in such a way as to be able to position itself around the connecting element 2, more precisely it is made in the form of a mechanical lead nut with a hollow tubular shape and threaded internally.

The first rotary element 5 is in effect equipped internally with a first thread 8 designed to engage rotatably with the first threaded portion 3 of the connecting element 2 in particular by means of a lead nut and screw or recirculating ball or roller coupling in such a way as to define a first threaded connection 3, 8 of the helical type.

Preferably, the first thread 8 has an axial extension greater than that of the first threaded portion 3 in such a way as to define a track along which the connecting element 2 can move.

As illustrated in FIG. 1, the first rotary element 5 is axially locked thanks to the presence, respectively, of ball bearings 6 and roller bearings 7; this means that the first rotary element 5 is mounted inside the mechanical transmission "T" in such a way as to be axially locked and therefore not able to translate along a direction parallel to the axis "X" but only able to perform a rotational movement about the axis "X".

In other words, the first rotary element 5 is positioned about the connecting element 2 in such a way that the first thread 8 enters rotatably into contact with the first threaded portion 3 of the connecting element 2 positioned on the first portion with larger diameter 2A and such as to create the first threaded connection.

Preferably, the first threaded connection 3, 8 is of the recirculating ball type wherein the balls are recirculated inside the connecting element 2.

The mechanical transmission "T" also comprises a fixed guide 9 forming part of the containment structure 1, in particular the fixed guide 9 extends from a cover "C" for closing the containment structure 1 towards the inside of the mechanical transmission "T".

The fixed guide 9 is made using a fixed body, preferably a pin, axially inserted inside the connecting element 2. Preferably, the fixed guide 9 is mounted in cantilever fashion, more preferably integral with the closing lid "C" of the containment body 1.

As illustrated in FIG. 2A, the fixed guide 9 has a second thread 14 designed to engage with the second threaded portion 4 of the connecting element 2 in such a way as to define a second threaded connection 4, 14 of the helical type, preferably recirculating ball screw type wherein the balls are recirculated along the connecting element 2.

Preferably, the second thread 14 has an axial extension greater than that of the second threaded portion 4 in such a way as to define a track along which the connecting element 2 can move.

In this way, the connecting element 2 is interposed between the first rotary element 5, to which it is rotatably connected by means of the first recirculating ball threaded connection 3, 8, and the fixed guide 9, to which it is connected by means of the second recirculating ball threaded connection 4, 14.

Preferably, the pitches of the first 3, 8 and the second threaded connection 4, 14 have a constant value along the entire axial extension of each threaded portion 3, 4.

Preferably, the first threaded connection 3, 8 and the second threaded connection 4, 14 are positioned on opposite surfaces of the connecting element 2. In particular, the first threaded connection 3, 8 is made on an outer surface of the connecting element 2 whilst the second threaded connection 4, 14 is made on the inner surface of the connecting element 2.

More in detail, the first threaded connection 3, 8 is made on the outer surface of the portion with larger diameter 2A whilst the second threaded connection 4, 14 is made on the inner surface of the first portion with larger diameter 2A.

As shown in FIG. 1, the first and second threaded connections are positioned in a position radially aligned one outside the other. Again from FIG. 1, the first threaded connection 3, 8 and the second threaded connection 4, 14 have different pitches from each other, preferably the first threaded connection 3, 8 has a smaller pitch than the second threaded connection 4, 14.

The connecting element 2 is therefore rotatably connected to the first rotary element 5 by the first threaded connection defined by the first threaded portion 3 of the connecting element 2 and by the first thread 8 of the first rotary element 5.

The connecting element 2 is also engaged with the fixed guide 9 by means of the second threaded connection 4, 14, defined by the second threaded portion 4 of the connecting element 2 and by the second thread 14 of the fixed guide 9. In this way, the outer surface of the portion with larger diameter 2A of the connecting element 2 rotates in contact with the rotary element 5 whilst the inner surface of the portion with larger diameter 2A moves in contact with the fixed guide 9.

In other words, the connecting element 2 is interposed between the first rotary element 5 and the fixed guide 9 and is simultaneously coupled to them respectively by the first and the second threaded connection. Since the first threaded connection 3, 8 and the second threaded connection 4, 14 have different pitches from each other, they allow a variation in the angular speed between the roto-translational element 2 and the first rotary element 5.

A rotation of the first rotary element 5 therefore corresponds to a roto-translation of the connecting element 2 the angular speed of which is less, in the case of transmission with a reduction in the transmission ratio, than that of the first rotary element 5 and as a function of the values of the pitches of the first and the second threaded connection.

More specifically, the speed of rotation of the connecting element 2 is reduced relative to the speed of rotation of the first rotary element 5 by a reduction ratio depending on the value of the pitches of the first threaded connection 3, 8 and of the second threaded connection 4, 14.

On the other hand, in the case of transmission with an increase in the transmission ratio, a speed of rotation of the connecting element 2 is obtained greater than that of the first rotary element 5.

Advantageously, in order to vary the transmission/reduction ratio it is necessary to suitably select the values of the pitch of the first threaded connection 3, 8 and of the second threaded connection 4, 14 and, therefore, the values of the pitches of the first and second threaded portions 3, 4 of the connecting element 2.

The mechanical transmission "T" also comprises a second rotary element 10 rotatable about the axis "X" and defining a mechanical power output element.

The second rotary element 10 is rotatably connected, preferably by means of a grooved or recirculating ball or recirculating roller connection, to the connecting element 2 to rotate about the axis "X" at the same rotary speed as the connecting element 2.

Preferably, as shown in the embodiments of the accompanying drawings, the second rotary element 10 is connected to the portion with reduced diameter 2B of the connecting element 2 by an annular portion 16 in such a way that the second portion with reduced diameter 2B is axially slidable relative to the second rotary element 10 and rotatably connected to it to rotate at the same speed as the second rotary element 10.

The annular portion 16 is positioned around and rotatably coupled to the second portion with a reduced diameter 2B of the connecting element 2. In that way, a recirculating ball screw 11 is positioned between the annular portion 16 of the second rotary element 10 and the second portion with reduced diameter 2B of the connecting element 2 in such a way that the rotational motion of the connecting element 2 is transmitted to the second rotary element 10. More in detail, the balls of the recirculating ball screw 11 are recirculated along the longitudinal grooves of the linear guide 15 of the portion with reduced diameter 2B of the connecting element 2.

Preferably, the second rotary element 10 also has an engagement portion 17 opposite to the annular portion 16 but rotatably integral with it. The engaging portion 17 is configured for engaging with a mechanical load.

To guarantee a transmission of only the rotary motion from the connecting element 2 to the second rotary element 10, the mechanical transmission "T" also comprises an axial locking mechanism acting on the second rotary element 10 for locking the sliding of the second rotary element 10 along the axis "X".

As illustrated in FIG. 1, the axial locking mechanism is made by means of a radial protrusion 12 of the second rotary element 10, preferably an annular rib, axially interposed between two locking means 13 mounted directly on the containment structure 1.

Preferably, the two locking means 13 are made in the form of two axial bearings which therefore lock the translation of the second rotary member 10 along the axis "X".

The locking mechanism thus prevents the transmission of the translational movement from the connecting element 2 to the second rotary element 10.

In other words, the connecting element 2 is free to rotate and translate but only the rotary movement is transmitted to the second rotary element 10 by means of the connection defined by the recirculating ball guide 11. The second rotary element 10 is then rotated with an angular speed equal to that of the connecting element 2.

In use, the rotary element 5, being connected to the drive unit, acts as a mechanical power input unit in the mechanical transmission "T".

In the embodiment illustrated in FIG. 1, the drive unit is represented by a rotor of an electric motor "M" (for example made by means of permanent magnets) mounted around the first rotary element 5.

In another embodiment, not illustrated, the drive unit is represented by a rotor of an electric motor "M" integrated with the first rotary element 5.

In a further embodiment, not illustrated, the drive unit is made using a portion shaped radially positioned around the first rotary element 5 and designed to act as power pick-up.

Advantageously, the position of the drive unit allows the entire rotary actuator "A" to have a small axial dimensions.

The drive unit, whatever its embodiment, rotates the first rotary element 5 with a predetermined angular speed. By means of the first threaded connection, the first rotary element 5 in turn rotates the connecting element 2.

The connecting element 2 thus, due to the motion imparted by the first rotary element 5, rotates about the axis of rotation "X" but simultaneously also translates along the axis "X" thanks to the presence of the fixed guide 9.

In particular, the connecting element 2 rotates with an angular speed different to that of the first rotary element 5, preferably, in the case of transmission with a reduction in the transmission ratio, with a lower angular speed which is a function of the values of the pitches of the first threaded connection 3, 8 and of the second threaded connection 4, 14. By the combined action of the recirculating ball screw 11 and the axial locking mechanism, the only rotary motion of the connecting element 2 is transmitted to the second rotary element 10 which therefore acts as a mechanical power output element.

The mechanical transmission "T" defines inside the actuator "A" two stages: a stage for reducing the motion, in the case of transmission with a reduction in the transmission ratio, and a stage for actually transmitting the motion.

In the stage for reducing the motion, the value of the angular speed of the first rotary element 5 is reduced, as a function of the pitches of the first threaded connection 3, 8 and of the second threaded connection 4, 14, and subsequently transmitted to the connecting element 2 which rotates with an angular speed which will be a function of the angular speed of the first rotary element 5 and of the pitches of the first and the second threaded connection.

In the actual transmission stage of the motion, on the other hand, the only rotational motion of the connecting element 2 is transmitted, thanks to the combined action of the recirculating ball screw 11 and the axial locking mechanism, to the second rotary element 10 which acts as an output element of the entire mechanical transmission "T".

The angular speed of the second rotary element 10 will also be a function of the angular speed of the first rotary element 5 and of the pitches of the first threaded connection 3, 8 and of the second threaded connection 4, 14 being the same as that of the connecting element 2.

Advantageously, since the reduction ratio between the angular speed of the first rotary element 5 and that of the second rotary element 10 depends on the pitches of the first and second thread, in order to reach "greater" reduction ratios it is necessary to accurately determine the values of the pitches of the first threaded connection 3, 8 and of the second threaded connection 4, 14 without there being the need to add rotational mechanisms (for example gear wheels to increase the stages) or increase the dimensions of the elements already present in the mechanical transmission "T".

If, for example, an angular speed of the connecting element 2 is to be obtained which is much less than that of the first rotary element 5 it is necessary to select a connecting element 2 having the pitches of the threaded connections suitably sized, in particular it will require a greater pitch of the second thread 4 and a pitch of the first thread 3 less than those previously selected.

In other words, having a value of the pitch of the second thread 4 which is much greater than the pitch of the first thread 3 it is possible to obtain a very high reduction value.

Preferably, the pitches of the first threaded connection have values of a few millimetres, for example 4-10 mm but also from 1 mm up to more than 10 mm. Preferably, the pitches of the second threaded connection have values greater than 50 mm, preferably greater than 200 mm and even more preferably greater than 1000 mm.

Advantageously, since the pitch of the first threaded connection 3, 8 is much less than that of the second threaded connection 4, 14, very high reduction ratios are obtained, of values equal, for example, to 400 or greater. Advantageously, thanks to the interposing of the connecting element 2 between the first rotary element 5 and the second rotary element 10 and thanks to the suitable sizing of the pitches of the first and second threaded connections, the transmission "T" is able to reach very high reduction ratios.

With a suitable choice of the pitches it is also possible to obtain transmission ratios in which the transmission ratio is multiplied.

In other words, the possibility of controlling the transmission ratio by means of the pitches of the threads makes it possible to obtain very high reduction ratios without having excessive dimensions and weights due to the presence of numerous reducer units such as chains and gear wheels.

By simply introducing the connecting element 2 it is therefore possible to obtain high reduction ratios without having to resort to entire chains of kinematic mechanisms. For this reason, the connecting element 2 acts both as a motion speed reducer since, thanks to the pitches of the first threaded connection 3, 8 and of the second threaded connection 4, 14, the speed of the motion is reduced and as an element for actually transmitting the motion since, thanks to the axial locking means and the recirculating ball screw 11, it transmits only the rotary motion to the second rotary element 10.

Advantageously, the mechanical transmission "T" does not have sliding elements and therefore does not have high wear mechanisms.

Advantageously, the mechanical transmission "T" does not have large dimensions and weights.

Advantageously, depending on the requirements, it is therefore possible to reduce the radial dimensions and/or the axial dimensions of the entire rotary actuator "A" since, simply by suitably selecting the values of the pitches of the first threaded connection 3, 8 and of the second threaded connection 4, 14 lying on the connecting element 2, it is possible to obtain reduction ratios which are more or less high.

In the embodiment shown in FIG. 1, the rotary actuator "A" has in effect a reduced axial size.

Figure 3:
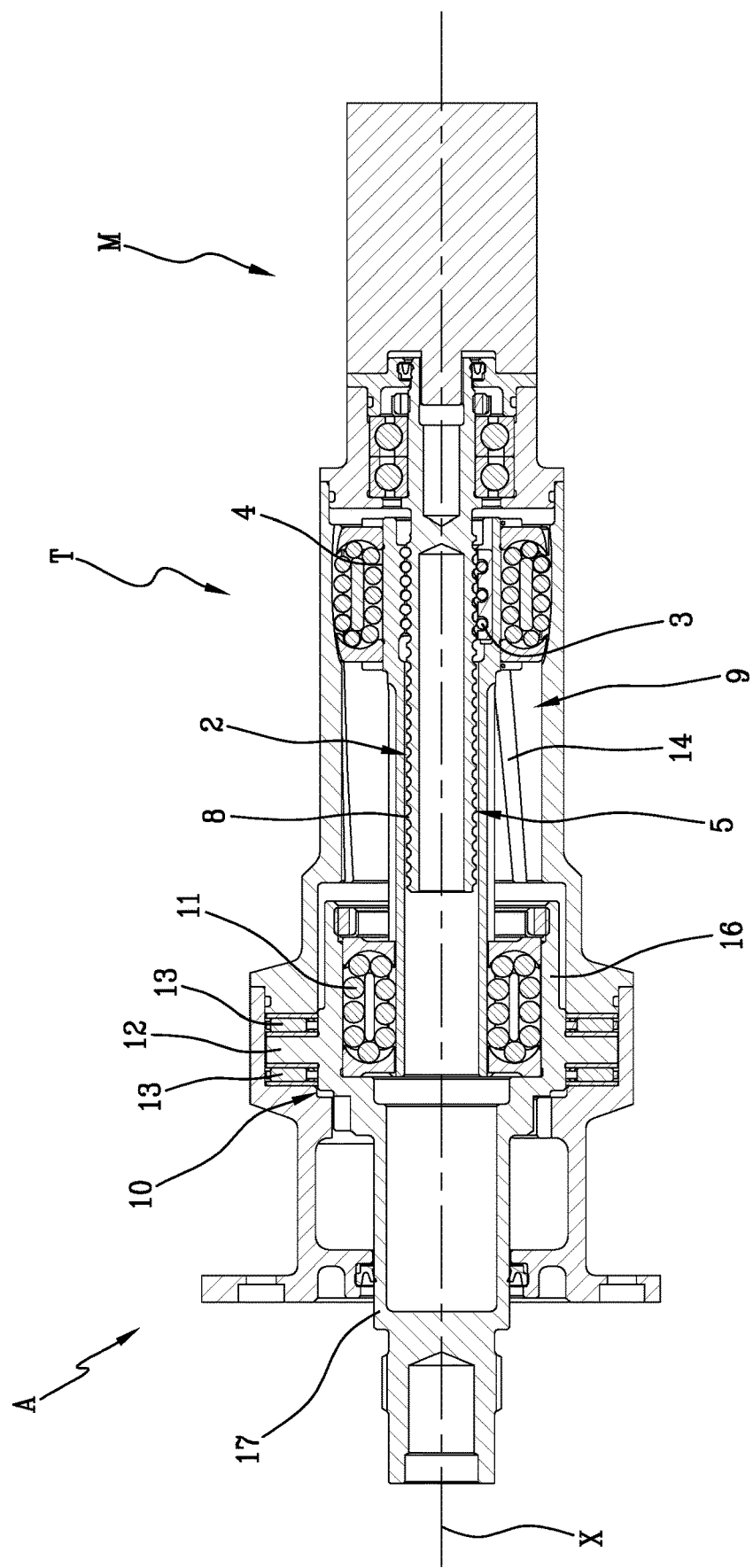
FIG. 3 is a cross section of a further embodiment of the mechanical transmission.

FIG. 3 shows, on the other hand, a further embodiment of the rotary actuator "A", wherein the rotary actuator "A" has a reduced radial size.

In particular, in the embodiment of the rotary actuator "A" of FIG. 3, the connecting element 2 is always made in the form of a roto-translational element as described above whilst the first rotary element 5 is made in the form of a shaft rotatable axially inserted inside the connecting element 2 whilst the fixed guide 9 is in this case made in the form of a hollow body in such a way as to be positioned outside around the connecting element 2.

Also in this case, the connecting element 2 is interposed between the fixed guide 9 and the first rotary element 5 but, unlike the embodiment illustrated in FIG. 1, the second threaded portion 4 of the connecting element 2 is positioned on the outer surface of the portion with larger diameter 2A whilst the first threaded portion 3 is positioned on the inner surface of the portion with larger diameter 2A of the connecting element 2.

In the embodiment illustrated in FIG. 3, the connecting element 2 is still made in the form of a roto-translational element having the features described above, the fixed guide 9 is made in the form of a hollow body, whilst since the first rotary element 5 is made in the form of a rotary shaft inserted inside the roto-translational element, the drive unit "M" is connected to the first rotary element 5 in an axial direction. The drive unit "M" is positioned coaxially with the first rotary element 5 in such a way that the entire transmission has a smaller radial dimension.

Also in this case, the drive unit may be made, for example, in the form of a rotor of an electric motor integrated or applied to the first rotary element 5.

Figure 4:
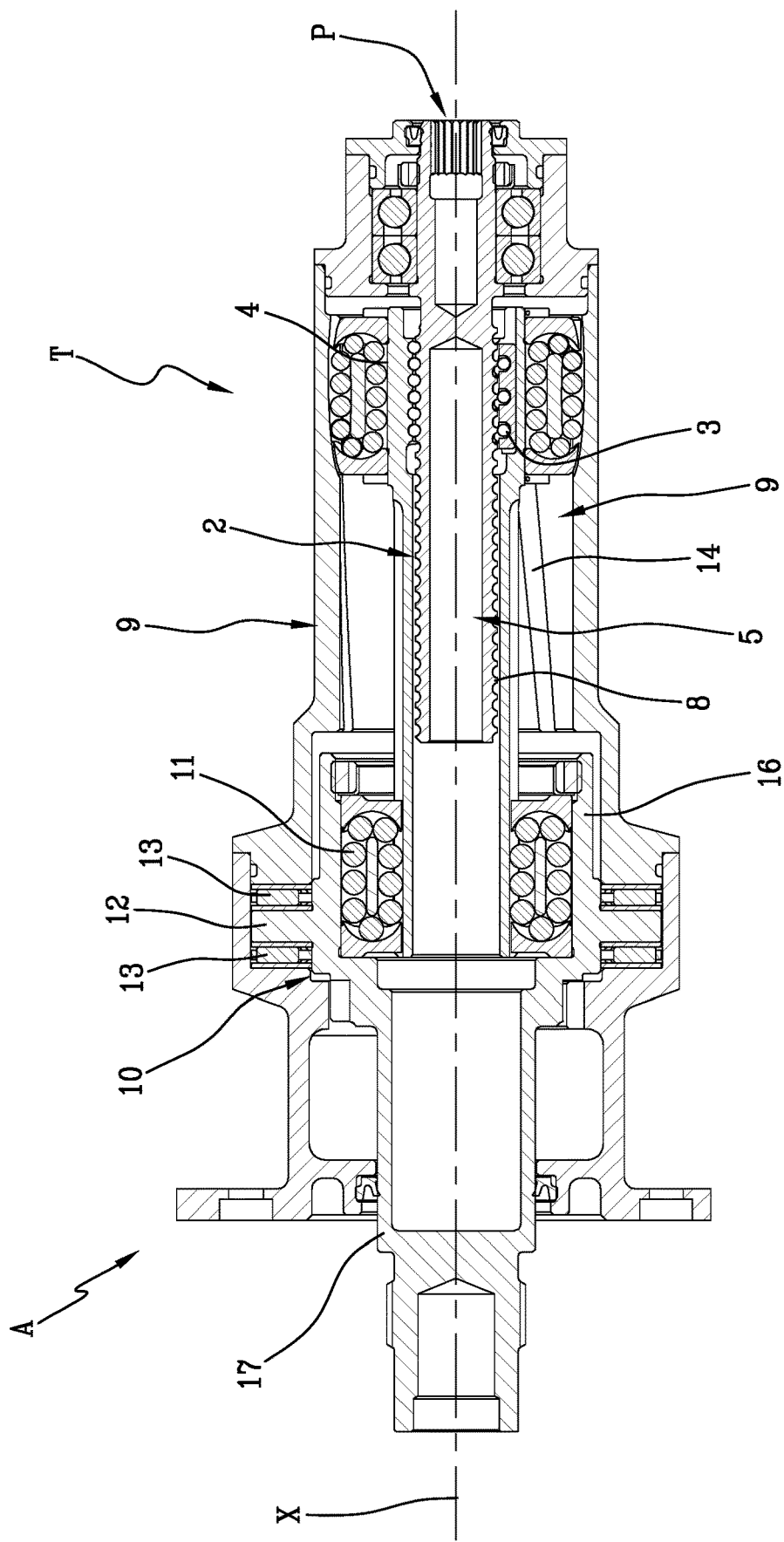
FIG. 4 is a cross section of a further embodiment of the mechanical transmission.
Figure 5:
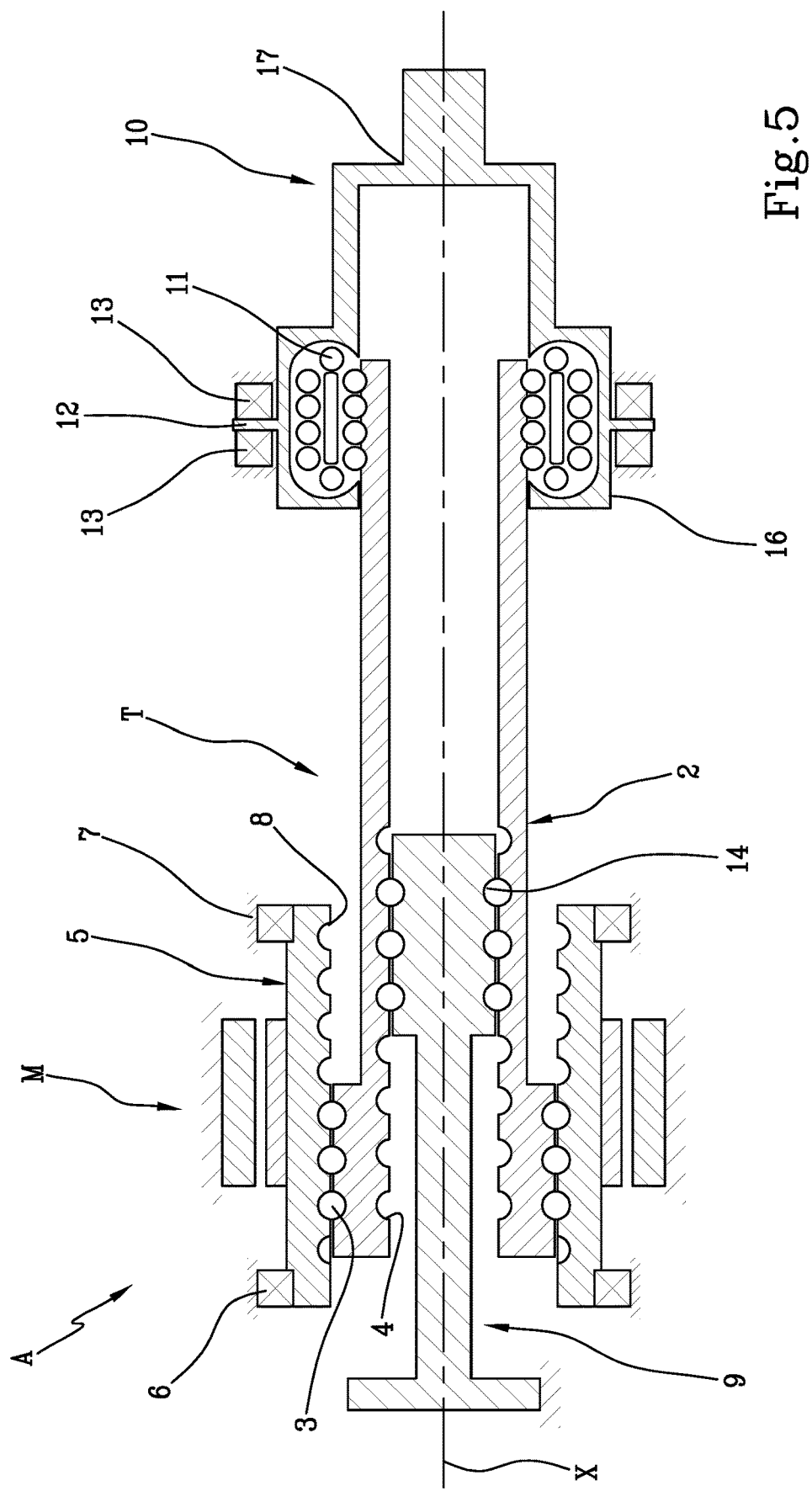
FIG. 5 shows a schematic representation of the mechanical transmission according to the invention.

FIG. 4 shows a further embodiment of the rotary actuator "A" where the connecting element 2, the fixed guide 9 and the rotary element 5 are made and positioned as described for the embodiment shown in FIG. 3.

In the case of the embodiment shown in FIG. 4, the rotary element 5 has, however, a grooved end "P" defining a connector for reversible connection to a drive shaft.

This embodiment, too, has reduced radial dimensions.

Figure 6:
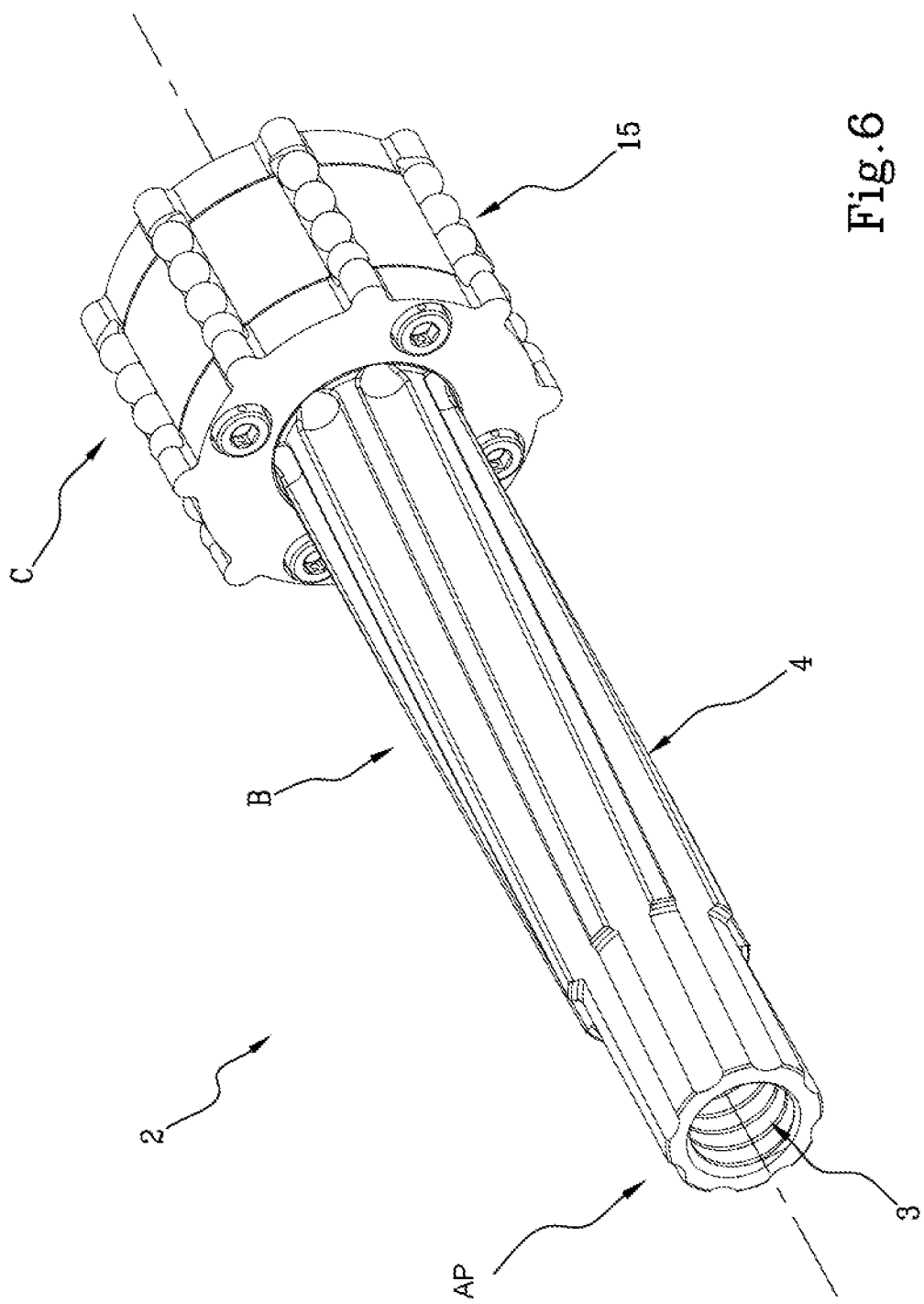
FIG. 6 shows a detail of a mechanical transmission according to the invention.

FIGS. 6 and 7 show a further embodiment of the actuator "A" and of the connecting element 2 inserted therein.

In particular, the connecting element 2 is made in the form of a roto-translational element along the axis "X" having the shape of a hollow body. The first rotary element 5 is made in the form of a shaft rotatably inserted inside the connecting element 2 whilst the fixed guide is positioned about the connecting element 2.

In the embodiment of FIG. 6, the connecting element 2 comprises a first axial portion AP having a first threaded portion 3 forming part of the first threaded connection 3, 8, a second axial portion B having a second threaded portion 4 forming part of the second threaded connection 4, 14, and a third axial portion C forming part of the linear guide 15 and defining in particular an end of the connecting element 2. The linear guide 15 is, also in this case, interposed between the connecting element 2 and the second rotary element 10.

Preferably, the second axial portion B is interposed between the first axial portion AP and the third axial portion C in such a way that the actuator "A" has, in order, the first threaded connection 3, 8, the second threaded connection 4, 14 and the linear guide 15.

In the case of the embodiment of FIG. 7, the first threaded connection 3, 8 and the second threaded connection 4, 14 are positioned in respective positions axially offset from each other along the axis X.

Preferably, the first threaded connection 3, 8 and the second threaded connection 4, 14 are made by recirculating balls or rollers wherein the balls or rollers are recirculated on the containment structure 1.

In other words, in the embodiment of FIG. 7, the connecting element 2 has the first threaded portion 3 made in an inner surface of the first portion AP for engaging with the first rotary element 5, the second threaded portion 4 made in an outer surface of the second portion B for engaging with the second rotary element 10 and the fixed guide 15 made in the third portion C for engaging with the fixed guide 9.

Moreover, also in this case the second rotary element 10 is axially locked under the action of axial locking means in such a way as to have a movement of only rotation about the axis "X". Preferably, as shown in FIG. 7, the second rotary element 10 is axially locked by mounting one or more bearings 22, for example ball bearings, whose inner rings are fitted outside the second rotary element 10 and locked there by a ring nut 23 and whose outer rings are similarly locked on the containment structure 1. The axial locking action does not require high axial reactions since, theoretically, the only axial action transmitted on the second rotary element 10 by the connecting element 2 is due to the friction (of reduced extent) of the balls of the linear guide 15.

As shown in FIG. 7, a hollow shaft 19, rotatable outside the connecting body 2 about the axis "X" is fitted on at least the first portion A, preferably also at least on part of an intermediate portion between the first and second portion A, B. The hollow shaft 19 is rotationally integral with the first rotary element 5, in particular by coupling between an end 19a of the hollow shaft 19 and the first rotary element 5 in such a way that they rotate at the same speed and in particular in such a way that the hollow shaft 19 rotates the first rotary element 5. The rotational coupling may be made using various forms, for example by means of grooved connection or, as shown in FIG. 7, by means of a transversal pin 20 engaged simultaneously in the hollow shaft 19, in particular in a through hole 21 made on the end 19a, and in a corresponding through hole of the first rotary element 5.

In this situation, between the hollow shaft 19 and the containment structure 1 there is a containment space suitable for installing an electric motor M.

In other words, to avoid excessive axial dimensions, the electric motor M is inserted in the containment space created between the containment structure 1 and the hollow shaft 19 and positioned in a position alongside the second threaded connection 4, 14 along the axis X with the rotor R fixed to the hollow shaft 19 or integral with it.

In this way, the rotor R of the motor M rotates the hollow shaft 19 which, being connected to the first rotary element 5, rotates the first rotary element 5.

In a further possible embodiment not illustrated, the electric motor M is made in the form of a motor with permanent magnets.

According to alternative embodiments not illustrated, the connecting element of FIG. 6 has the grooves of the linear guide 15 alternated in an alternating direction with the grooves of the second threaded portion 4 (in which case, the grooves of the second threaded portion 4 would be further from each other than that shown in FIG. 6, to make space for the grooves of the linear guide 15) or, alternatively, the connecting element of FIG. 6 has the grooves of the linear guide 15 intersecting the grooves of the second threaded portion 4. In both situations, the grooves of the linear guide 15 and the grooves of the second threaded portion 4 are positioned on the same outer surface of the connecting element 2.

Advantageously, the embodiments shown in FIGS. 1, 3, 4 and 7 indicate the considerable degree of versatility of the mechanical transmission "T" according to the invention. In particular, these drawings show the possibility of interchanging the position of the threaded connections and of the grooves of the linear guide 15 as well as of the various components such as first and second rotary elements 5, 10, fixed guide 9 and connecting element 2.

In a further embodiment, not illustrated, the mechanical transmission "T" has the linear guide 15 positioned between the fixed guide 9 and the connecting element 2 in such a way that the connecting element 2 is equipped with only translation movement along the axis "X". The translation of the connecting element 2 along the axis "X" is therefore determined by the rotation of the first rotary element 5 about the axis "X".

In this solution, the second threaded connection 4, 14 is positioned between the connecting element 2 and the second rotary element 10. The rotation of the second rotary element 10 about the axis "X" is therefore determined by the translation of the connecting element 2 along the axis "X".

In other words, the two threaded connections 3, 8; 4, 14 are positioned on different portions of the connecting element 2, in particular on two stretches axially offset along the axis "X". This defines two lead nut and screw connections functionally positioned in series in the opposite configuration and interconnected using the same connecting element 2. In particular, the first threaded connection 3, 8 transforms the rotation of the first rotary element 5 into a translation of the connecting element 2, whilst the second threaded connection 4, 14 transforms the translation of the connecting element 2 into a rotation of the second rotary element 10. This second transformation is also facilitated by the fact that the second threaded connection 4, 14 preferably has a large pitch and greater than the pitch of the first threaded connection 3, 8.

Preferably, in this embodiment the connecting element 2 has on its outer surface both the first threaded portion 3 and the second threaded portion 4 whilst the fixed guide 9 has the longitudinal grooves of the linear guide 15.

The mechanical transmission "T" of the above-mentioned embodiment also comprises an axial locking mechanism acting between the containment structure 1 and the second rotary element 10 for locking the sliding of the second rotary element 10 along said axis "X".

According to a possible embodiment, the axial locking mechanism is also made in this case by means of a radial protrusion 12 of the second rotary element 10, preferably an annular rib, axially interposed between two locking means 13 mounted on the containment structure 1, in particular two axial bearings.

Advantageously, also in this case, there is a variation in the angular speed between the first rotary element 5 and the second rotary element 10 as a function of the difference between the pitches of the first threaded connection 3, 8 and the second threaded connection 4, 14.

In use, the rotary actuator "A" described in its various embodiments is used for actuating wing flaps of aircraft or nose doors of aircraft, in particular by means of a direct and coaxial assembly on a hinge for rotation, respectively, of flaps or doors.

The invention achieves the above-mentioned aims, eliminating the drawbacks highlighted in the prior art.

In effect, the structure of the mechanical transmission "T" described and claimed in this way allows high reduction ratios to be obtained without there being the need to increase the overall size and weight of the transmission adding mechanical gear or kinematic mechanisms such as, for example, gear wheels. This advantage makes the mechanical transmission "T" excellent for applications on aircraft.

A further advantage derives from the fact that the mechanical transmission "T" is less complex than traditional transmissions and, therefore, a better mechanical efficiency, especially at low temperatures.

A further advantage derives from the fact that, even in order to reach high transmission ratios, the mechanical transmission "T" requires a smaller number of components making the entire transmission more reliable.

A further advantage derives from the fact that the mechanical transmission "T" has a smaller "backlash" and a greater rigidity since there are no chains and gear wheels.

A further advantage derives from the fact that the transmission system, in its normal operation, does not comprise sliding elements. The absence of sliding friction therefore guarantees a greater service life of the mechanical transmission "T".

A further advantage derives from the fact that the mechanical transmission "T" makes it possible to create a reduction ratio such as to reduce the torque required for the drive unit of the rotary actuator "A" and increase its speed of rotation without using gear boxes but simply by varying the pitch of the first and the second threaded connection. This results in a greater efficiency and reliability of the entire linear actuator "A".

A further advantage derives from the fact that the rotary actuator "A", described in the above-mentioned different embodiments, makes it possible to obtain lower axial dimensions (in the case of the embodiment of FIG. 1) or smaller radial dimensions (in the case of the embodiments of FIGS. 3 and 4).

A further advantage derives from the possibility of positioning the threaded connections and the linear guide in different positions of the connecting element 2 making the actuators "A" very versatile.

The invention claimed is:

1. A rotary mechanical transmission, comprising:
a containment structure;
a first rotary element, connected or connectable to a drive unit to define a mechanical power input unit and rotatable about an axis;
a fixed guide, forming part of said containment structure;
a second rotary element rotatable about said axis and defining a power output unit;
a connecting element extending along said axis of rotation and coupled to said first rotary element by a first threaded connection, said first threaded connection being defined by a first recirculating ball connection,
wherein said connecting element is also coupled with one of either said fixed guide or said second rotary element by a second threaded connection, said second threaded connection being defined by a second recirculating ball connection, and with the other of either said fixed guide or said second rotary element by a linear guide parallel to said axis;
wherein said first threaded connection and second threaded connection have different pitches to vary an angular speed between the connecting element and the first rotary element;
said connecting element formed as a roto-translational element extending along the axis and configured for translating along said axis and simultaneously rotating about said axis;
said second threaded connection being positioned between the connecting element and said fixed guide; and
said linear guide being positioned between the connecting element and the second rotary element such that the second rotary element is rotatably connected to the connecting element for rotating at a same angular speed as the connecting element, said linear guide being defined by a third recirculating ball connection.

2. The transmission according to claim 1, and further comprising an axial locking mechanism acting between the containment structure and the second rotary element for locking a sliding of the second rotary element along said axis, said axial locking mechanism being made by a radial protrusion of the second rotary element, axially interposed between two locking axial bearings mounted on the containment structure.

3. The transmission according to claim 1, wherein a pitch of said first threaded connection is between 1 and 10 mm, and wherein a pitch of said second threaded connection has a value greater than 50 mm.

4. The transmission according to claim 3, wherein the pitch of said first threaded connection is between 1 and 10 mm, and wherein the pitch of said second threaded connection has values greater than 200 mm.

5. The transmission according to claim 3, wherein the pitch of said first threaded connection is between 1 and 10 mm, and wherein the pitch of said second threaded connection has values greater than 1000 mm.

6. The transmission according to claim 1, wherein said connecting element is a hollow body and wherein said threaded connections are positioned on opposite surfaces of said connecting element, one of said threaded connections being positioned on an inner surface of the connecting element and the other of said threaded connections being positioned on an outer surface of the connecting element such that said connecting element is radially positioned between said first rotary element and said fixed guide.

7. The transmission according to claim 6, wherein said first threaded connection and the second threaded connection are positioned in a radially aligned position, one outside the other.

8. The transmission according to claim 6, wherein said first threaded connection is defined by a first thread lying on said first rotary element and by a first threaded portion lying on said connecting element, and wherein said second threaded connection is defined by a second thread lying on said fixed guide and by a second threaded portion lying on said connecting element.

9. The transmission according to claim 6, wherein said fixed guide is a fixed body axially inserted inside the connecting element and wherein the first rotary element is hollow and positioned around the connecting element, said fixed body being mounted in a cantilever fashion, integral with a cover for closing said containment body.

10. The transmission according to claim 6, wherein the first rotary element is a rotary shaft axially inserted inside the connecting element and wherein said fixed guide is positioned around the connecting element, said first rotary element having a splined terminal defining a connector for reversible connection to a drive shaft.

11. The transmission according to claim 10, wherein said first threaded connection and said second threaded connection are positioned in respective positions axially offset from each other along the axis, the recirculating balls of the first and second recirculating ball connections being recirculated on said containment structure.

12. The transmission according to claim 11, wherein said connecting element comprises a first axial portion, having a first threaded portion forming part of said first threaded connection, a second axial portion, having a second threaded portion forming part of said second threaded connection, and a third axial portion forming part of said linear guide and defining an end of said connecting element, said second axial portion being interposed between said first axial portion and said third axial portion.

13. The transmission according to claim 12, wherein on at least the first axial portion, and also at least on part of an intermediate portion between said first and second axial portions, there is fitted a hollow shaft rotatable outside said connecting body, said hollow shaft having a termination connected rotationally to the first rotary element such that between said hollow shaft and said containment structure there is a containment space suitable for installing an electric motor.

14. The mechanical transmission according to claim 1, and further comprising:
said linear guide being positioned between the fixed guide and the connecting element such that the connecting element is only equipped with translation movement along said axis, the translation of the connecting element along the axis being determined by the rotation of the first rotary element about the axis;
said second threaded connection being positioned between the connecting element and the second rotary element, the rotation of the second rotary element about the axis being determined by the translation of the connecting element along the axis;
an axial locking mechanism acting between the containment structure and the second rotary element for locking the sliding of the second rotary element along said axis, said axial locking mechanism being a radial protrusion of the second rotary element, axially interposed between two locking axial bearing mounted on the containment structure.

15. A rotary actuator, comprising the mechanical transmission according to claim 1, and an electric motor connected to said first rotary element, and having a rotor connected to or integral with said first rotary element.

16. An aircraft comprising the rotary actuator according to claim 15 for actuating wing flaps or a nose door of the aircraft, by a direct and coaxial assembly on a hinge for rotating, respectively, said wing flaps or nose door.

* * * * *